April 10, 1962  C. HORVATH ET AL  3,029,022
APPARATUS FOR DETERMINING THE RATIO BETWEEN
TWO D.C. POWER SOURCES
Filed March 3, 1959

INVENTORS:
CHARLES HORVATH &
ADAM F. LUKASIK
By Donald G. Dalton
ATTORNEY

United States Patent Office 3,029,022
Patented Apr. 10, 1962

3,029,022
APPARATUS FOR DETERMINING THE RATIO
BETWEEN TWO D.C. POWER SOURCES
Charles Horvath, East Chicago, and Adam F. Lukasik, Gary, Ind., assignors to United States Steel Corporation, a corporation of New Jersey
Filed Mar. 3, 1959, Ser. No. 796,806
6 Claims. (Cl. 235—103.5)

This invention relates to apparatus for determining the ratio between two D.C. power sources and more particularly for determining the extension of strip being rolled. Various types of instruments have been provided for measuring tension such as shown in Rendel Patent No. 2,447,208, dated August 17, 1948, and Reed Patent No. 2,525,182, dated October 10, 1950. While certain of these instruments have been used satisfactorily they do have some disadvantages. Apparatus such as shown in the Reed patent has the disadvantage that it will not operate satisfactory unless the generators have identical characteristics. This is difficult to obtain, especially in standard generators. Another disadvantage of apparatus commonly used at present is that the apparatus does not start functioning accurately until after a substantial length of the strip has passed through the mill. Therefore, the gage reading for this portion of strip is not correct. Variation in the diameter of the rolls driven by the strip also is a source of error in obtaining percent elongation.

It is therefore an object of our invention to provide apparatus for accurately determining a ratio between two direct current sources.

Another object is to provide inexpensive apparatus which will measure elongation accurately over most of the length of a strip being rolled.

Figure 1:
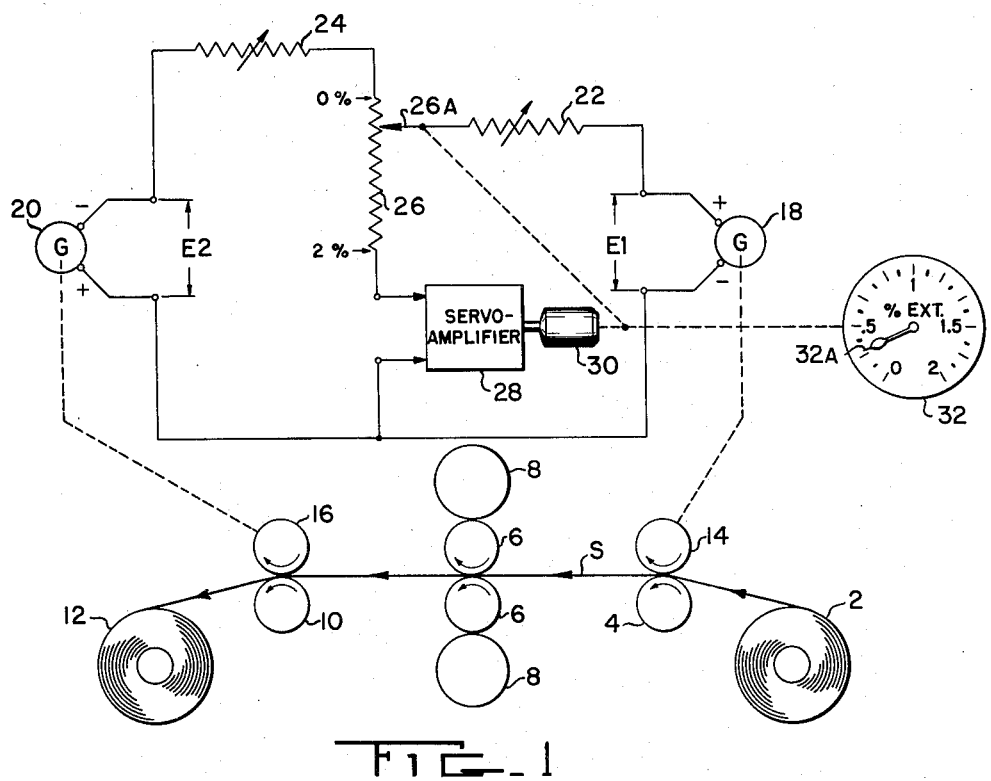
Figure 2:
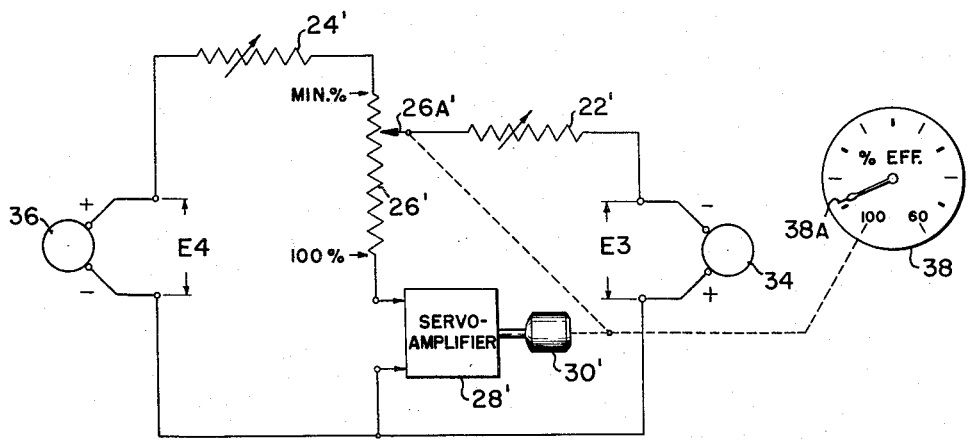

These and other objects will be more apparent after referring to the following specification and attached drawings, in which:

FIGURE 1 is a schematic view of our invention as incorporated in an extensometer on a temper rolling mill; and FIGURE 2 is a schematic view showing our apparatus as applied in measuring the efficiency of a machine.

Referring more particularly to FIGURE 1, the reference numeral 2 indicates an uncoiler from which the strip S is uncoiled. The uncoiled strip passes over an idler or billy roll 4 into the work rolls 6 of a temper rolling mill which is provided with the usual back up rolls 8. After passing through the work rolls 6 the strip S passes over billy roll 10 and is coiled on the coiler 12. Rolls 14 and 16 bear upon the strip S at rolls 4 and 10, respectively. Roll 14 is mechanically connected to drive a tachometer generator 18 and roll 16 is mechanically connected to drive a tachometer generator 20. The generators are of the same type with their characteristics being as closely matched as is usual in standard equipment. The negative terminal of generator 18 is connected to the positive terminal of generator 20 and the positive terminal of generator 18 is connected to the negative terminal of generator 20. Variable resistors 22 and 24 are provided in the last named connection. A slide wire 26 having an arm 26A is connected in series with a servo-amplifier 28 across the first two connections. The arm 26A is driven by a motor 30 which is also connected to arm 32A of gage 32. A torque is applied to the motor 30 by means of servo-amplifier 28.

The operation of our device is as follows:

Strip S is passed between the rolls 4 and 14 and 10 and 16 without any reduction in gage and the resistors 22 and 24 are adjusted so that the arm 26A is at position "0" and the ratio between the values of the resistors are inversely proportional to the diameter of the rolls driving the generators adjacent the resistors. In other words, $$\frac{\text{diameter of roll 14}}{\text{diameter of roll 16}} = \frac{\text{value of resistor 24}}{\text{value of resistor 22}}$$

However, this relationship is not exact since any slight differences in the characteristics of tachometer generators 18 and 20 are also compensated for. At this time, voltage E1 will equal voltage E2 with the null point occurring at the end of slide wire 26 connected to resistor 24. When extension occurs in the strip, voltage is supplied to servo-amplifier 28 thus causing motor 30 to move arm 26A to a position where electrical balance occurs along slide wire 26. At the same time, motor 30 moves arm 32A to indicate percentage of extension on gage 32. The gage 32 can be calibrated in any suitable manner such as by calculation or by calibrating from known extension. After calibration resistors 22 and 24 are normally kept at their adjusted values. The apparatus may be checked from time to time by passing a strip therethrough without any extension. If adjustment is necessary resistor 22 will normally be adjusted with resistor 24 remaining in its fixed position.

In the embodiment of our invention shown in FIGURE 2, sensing devices 34 and 36 apply voltages E3 and E4 to the percentage meter with the polarities as shown. Voltage E3 is proportional to the energy consumed by the machine and voltage E4 is proportional to the energy delivered in performing work. When the minimum efficiency percent to be measured full scale has been determined the ratio of the resistance values of slide wire 26' to resistor 22' is made to read as zero to 100% and the total resistance of slide wire 26' and resistor 24' is made equal to the resistance of resistor 22'. At 100% efficiency the slide wire arm 26A' will stop at the end of the slide wire connected to servo-amplifier 28'. For efficiencies of less than 100% the servo-amplifier 28' will apply a torque to motor 20' to move the arm 26A' to an intermediate position along the length of slide wire 26'. Arm 38A of meter 38 is connected to motor 30' so as to indicate percent efficiency. The meter of FIGURE 1 differs from that of FIGURE 2 only in the calibration of scales 32 and 38 and in the proportions of the resistance values of the resistors and slide wire.

While two embodiments of our invention have been shown and described it will be apparent that other adaptations and modifications may be made without departing from the scope of the following claims.

We claim:

1. An extensometer for determining the elongation of strip passing through a reducing machine which comprises a roll driven at a speed proportional to entering strip speed, a second roll driven at a speed proportional to exit strip speed, a first D.C. generator driven by said first roll, a second D.C. generator driven by said second roll, an electrical connection between the negative terminal of the first generator and the positive terminal of the second generator, an electrical connection between the positive terminal of the first generator and the negative terminal of the second generator, a slidewire having an adjustable arm, a motor connected to move said arm, one of said electrical connections including a first resistor, said arm and a second resistor in series, at least one of said resistors being adjustable, a third electrical connection between said first and second electrical connections including said slidewire and a servo-amplifier connected in series, and means connecting said servo-amplifier to said motor, one of said resistors being on one side of said third electrical connection and the other being on the other side of said third electrical connection.

2. An extensometer for determining the elongation of strip passing through a reducing machine which comprises a roll driven at a speed proportional to entering strip speed, a second roll driven at a speed proportional to exit strip speed, a first D.C. generator driven by said first roll, a second D.C. generator driven by said second roll, an electrical connection between the negative terminal of the first generator and the positive terminal of the second generator, an electrical connection between the positive terminal of the first generator and the negative terminal of the second generator, a slidewire having an adjustable arm, a motor connected to move said arm, one of said electrical connections including a first resistor, said arm and a second resistor in series, at least one of said resistors being adjustable, a third electrical connection between said first and second electrical connections including said slidewire and a servo-amplifier connected in series, and means connecting said servo-amplifier to said motor, one of said resistors being on one side of said third electrical connection and the other being on the other side of said third electrical connection, the adjusted ratio between the values of said resistors being inversely proportional to the diameters of the rolls driving the generators adjacent said resistors.

3. An extensometer for determining the elongation of strip passing through a reducing machine which comprises a roll driven at a speed proportional to entering strip speed, a second roll driven at a speed proportional to exit strip speed, a first D.C. generator driven by said first roll, a second D.C. generator driven by said second roll, an electrical connection between the negative terminal of the first generator and the positive terminal of the second generator, an electrical connection between the positive terminal of the first generator and the negative terminal of the second generator, a slidewire having an adjustable arm, a motor connected to move said arm, one of said electrical connections including a first adjustable resistor, said arm, and a second adjustable resistor in series, a third electrical connection between said first and second electrical connections including said slidewire and a servo-amplifier connected in series, and means connecting said servo-amplifier to said motor, one of said adjustable resistors being on one side of said third electrical connection and the other being on the other side of said third electrical connection.

4. An extensometer for determining the elongation of strip passing through a reducing machine which comprises a roll driven at a speed proportional to entering strip speed, a second roll driven at a speed proportional to exit strip speed, a first D.C. generator driven by said first roll, a second D.C. generator driven by said second roll, an electrical connection between the negative terminal of the first generator and the positive terminal of the second generator, an electrical connection between the positive terminal of the first generator and the negative terminal of the second generator, a slidewire having an adjustable arm, a motor connected to move said arm, one of said electrical connections including a first adjustable resistor, said arm, and a second adjustable resistor in series, a third electrical connection between said first and second electrical connections including said slidewire and a servo-amplifier connected in series, and means connecting said servo-amplifier to said motor, one of said adjustable resistors being on one side of said third electrical connection and the other being on the other side of said third electrical connection, the adjusted ratio between the values of said resistors being inversely proportional to the diameters of the rolls driving the generators adjacent said resistors.

5. Apparatus for determining the ratio between two D.C. power sources comprising an electrical connection between the negative teminal of the first power source and the positive terminal of the second power source, an electrical connection between the positive terminal of the first power source and the negative terminal of the second power source, a slidewire having an adjustable arm, a motor connected to move said arm, one of said electrical connections including a first resistor, said arm and a second resistor in series, at least one of said resistors being adjustable, a third electrical connection between said first and second electrical connections including said slidewire and a servo-amplifier connected in series, and means connecting said servo-amplifier to said motor, one of said resistors being on one side of said third electrical connection and the other being on the other side of said third electrical connection.

6. Apparatus for determining the ratio between two D.C. power sources comprising an electrical connection between the negative terminal of the first power source and the positive terminal of the second power source, an electrical connection between the positive terminal of the first power source and the negative terminal of the second power source, a slidewire having an adjustable arm, a motor connected to move said arm, one of said electrical connections including a first adjustable resistor, said arm, and a second adjustable resistor in series, a third electrical connection between said first and second electrical connections including said slidewire and a servo-amplifier connected in series, and means connecting said servo-amplifier to said motor, one of said adjustable resistors being on one side of said third electrical connection and the other being on the other side of said third electrical connection.

References Cited in the file of this patent
UNITED STATES PATENTS

| | | |
|---|---|---|
| 2,525,182 | Reed | Oct. 10, 1950 |
| 2,673,030 | Isserstedt | Mar. 23, 1954 |
| 2,829,828 | Hollenbach | Apr. 8, 1958 |
| 2,918,270 | Golding | Dec. 22, 1959 |